United States Patent [19]

Sabon

[11] 4,355,209
[45] Oct. 19, 1982

[54] PROGRAMMABLE LINE CIRCUIT
[75] Inventor: Robert J. Sabon, Chicago, Ill.
[73] Assignee: GTE Automatic Electric Labs Inc., Northlake, Ill.
[21] Appl. No.: 220,669
[22] Filed: Dec. 29, 1980
[51] Int. Cl.³ .................. H04G 1/30; H04M 3/00
[52] U.S. Cl. ................................................ 179/18 FA
[58] Field of Search ............ 179/18 F, 18 FA, 81 R, 179/81 A, 84 R, 84 A, 18 HB

[56] References Cited
U.S. PATENT DOCUMENTS 4,104,488  8/1978  Weir et al. .................. 179/18 FA
4,191,859  3/1980  Sabon ........................ 179/18 FA
4,282,407  8/1981  Stiefel et al. ................ 179/18 FA Primary Examiner—Thomas A. Robinson
Attorney, Agent, or Firm—Robert J. Black; Gregory G. Hendricks

[57] ABSTRACT

A circuit which can perform a plurality of sensor functions relating to telephone subscriber supervisory circuits. These functions can occur before and after ringing current is applied to the subscriber line facility. Coils function as magnetic field generating devices and a Hall effect device is used to perform the sensory functions. A programmable comparator is used to compare detected conditions with predetermined thresholds.

9 Claims, 1 Drawing Figure

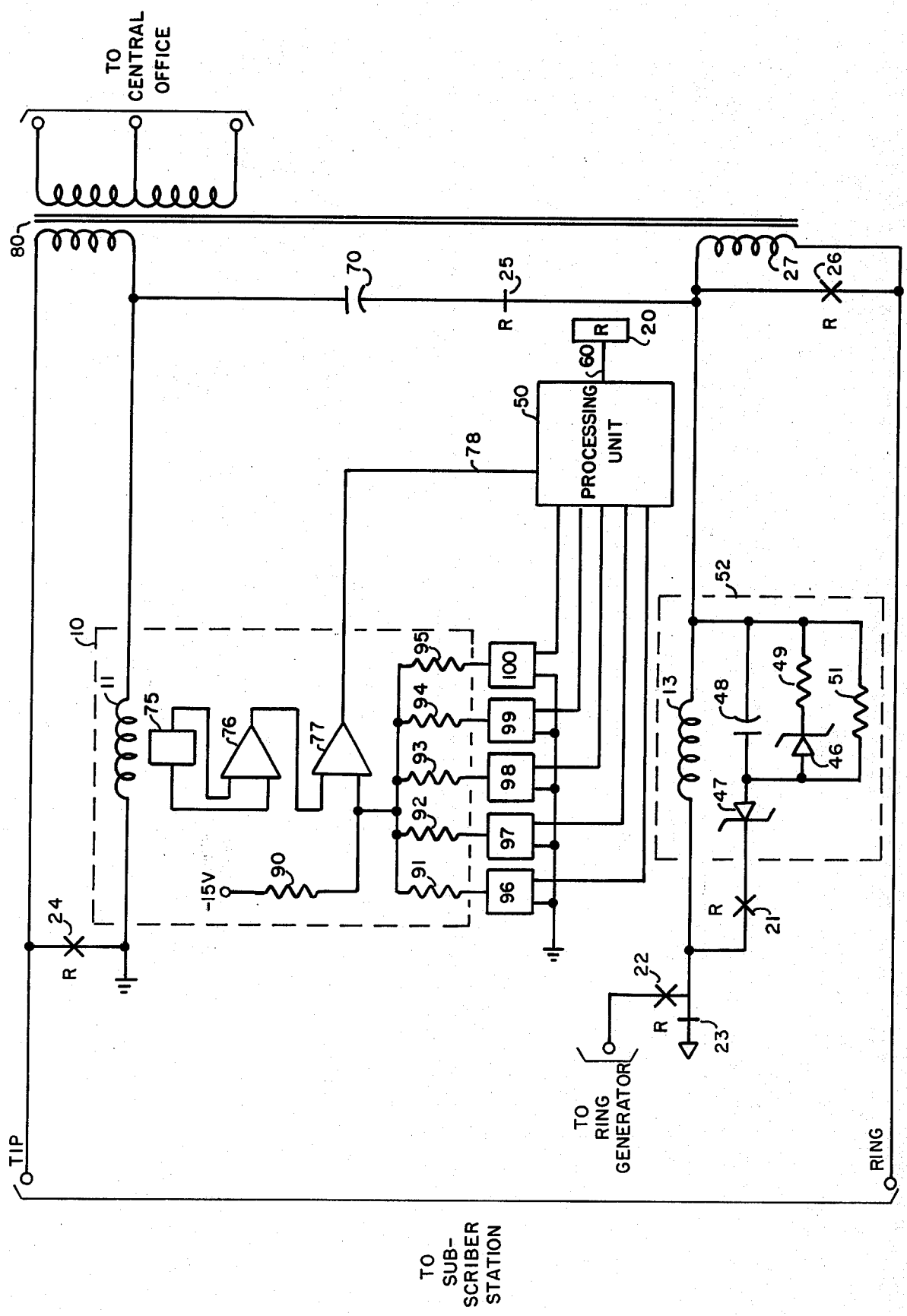

PROGRAMMABLE LINE CIRCUIT

BACKGROUND OF THE INVENTION

(1) Field of the Invention

The present invention relates to telephone line circuits and more particularly to a circuit which can perform the full range of line supervision functions.

(2) Description of the Prior Art

The use of Hall effect devices in line circuits has previously been disclosed in U.S. Pat. No. 4,166,928 issued on Sept. 4, 1979 to R. J. Sabon. However, this circuit is limited to the detection of loop status either during the presence or absence of ringing current.

The Hall effect device, however, can provide an output signal representative of minute variations in loop or line current. Thus its potential for use in monitoring all varieties of line conditions has not been developed. The prior art still uses relay type line circuits to test line conditions such as on-hook leakage current, open circuit ringer test, power cross, and ring ground short. Thus the prior art has not been able to adapt Hall effect devices to the full range of line supervision functions.

Accordingly, it is the object of the present invention to provide a novel line circuit, utilizing a single Hall effect device to perform the full range of line supervision functions.

SUMMARY OF THE INVENTION

The present invention is a circuit which provides not only loop, dial, and ring trip detection, but other sensory functions as well. These include power cross/ring ground short, open circuit ringer test, and leak test. This circuit is included in the line monitoring equipment of a telephone central office. It monitors the status and condition of an associated telephone station apparatus and facility.

This circuit consists of a pair of coils connected in series with the loop facility, with one coil included in the tip lead and the other in the ring lead. A Hall effect device is mounted in the magnetic field generated by these coils and provides electrical outputs corresponding to the presence or absence of magnetic flux. The output emitted from the Hall device is then amplified to provide a more useable signal level. The amplified signal is then applied to an externally programmable comparator whose output provides an indication of the relative state of input potential.

Since one input represents a reference potential and the other input an unknown, the comparator output indicates whether the unknown potential is above or below the reference potential. This circuit can monitor any desired line condition merely by programming an associated reference potential. Also, a sensing current shunt network is connected in parallel with the ring lead coil when the central office operates the ringing relay to apply ringing current to the loop facility.

When a telephone subscriber's hookswitch is operated, a loop is established to the central office and current flows from battery to ground through the loop and therefore through the two coils in the tip and ring leads of the loop. This current flow in the pair of coils produces a magnetic flux which is detected by a Hall effect device mounted in magnetic proximity to the coils. The Hall effect device sends a corresponding electrical signal to an associated amplifier which amplifies this signal and applies it to the externally programmable comparator.

Each of the variety of conditions which occur within the loop alter loop current and therefore alter the electrical output of the Hall effect device and amplifier. Each of these conditions can be distinguished by proper programming of the comparator.

This invention provides for the detection of dial pulses, on/off hookswitch supervision, power cross/ring ground short, open circuit ringer test, ring trip, and leak test. Other conditions such as coin ground detection on ring lead or second party identification on tip lead could also be monitored with this circuit. This is possible because each of these condition cause a different level of flux to be generated within the coils and these different flux levels can be distinguished by the programmable comparator.

DESCRIPTION OF THE DRAWING

The single FIGURE of the accompanying drawing is a schematic diagram of the programmable line circuit of the present invention.

DESCRIPTION OF THE PREFERRED EMBODIMENT

Referring now to the accompanying drawing, the programmable line circuit of the present invention is shown. Sensing circuit 10 is connected to the subscriber loop in the subscriber line circuit in the central office and it is used to monitor the subscriber line status. The tip lead of the subscriber loop is terminated with ground and the ring lead of the subscriber loop is terminated with 48 volt battery. This circuit includes flux generator coil 11 connected in series in the tip lead and flux generator coil 13 connected in series in the ring lead. Hall effect device 75 is mounted in the magnetic field of flux generators 11 and 13 and its output is shown connected to amplifier 76. The output of amplifier 76 is shown connected to comparator 77, whose output is shown connected to processing unit 50. Resistive network 91-95 is also connected to comparator 77. These resistors are connectable to ground via switches 96-100 which represent the programmable portion of comparator 77. Switches 96-100 typically comprise relays or transistors and comparator 77 is typically an operational amplifier.

A network consisting of zener diodes 47 and 46, capacitor 48, and resistors 49 and 51 is connected in series with make contact 21 of ringing relay 20, both of which are connected in parallel with coil 13.

The magnetic flux generating means, coils 11 and 13 are mechanically designed around a bobbin containing a pocket for rigid and precise positioning of the Hall effect device. This design also provides for the adjustability of the magnetic flux density through positioning of the central core which functions as a portion of the metallic flux return path.

Normally, the subscriber hookswitch is in a nonoperated position causing a lack of continuity in the subscriber loop and an absence of current flow from battery to ground through flux coils 11 and 13. Therefor coils 11 and 13 do not generate a magnetic flux under this condition. The output signal from comparator 77 via lead 78 provides an indication of this condition to processing unit 50 since the Hall effect 75 and amplifier 76 provide an output voltage to comparator 77 that is less than the chosen comparator reference voltage.

When the subscriber hookswitch is operated, the loop is closed and current flows from battery to ground through flux generating coils 11 and 13 which produce a magnetic flux. Hall effect device 75 responds to this magnetic flux and generates a voltage which is amplified by amplifier 76, and applied to comparator 77. This voltage is greater than the chosen reference voltage, thus causing comparator 77 to generate a corresponding signal on lead 78 which informs processing unit 50 of the detection of loop current.

To detect leakage current, resistors 91-95 may be chosen so as to provide a comparator normalized reference voltage which represents a voltage slightly below that expected to be caused by resistive leakage. If resistive leakage is developed across an open hookswitch it will cause a small current to flow through the loop thereby generating a magnetic field in coils 11 and 13. These coils then generate a corresponding magnetic flux which is detected by Hall effect device 75. This device then generates a corresponding voltage which is amplified by amplifier 76 and applied to comparator 77. If this voltage is greater than the reference voltage at the reference input, comparator 77 generates a corresponding output signal on lead 78. This signal informs Processing Unit 50 of the detection of a resistive leakage condition on the subscribers loop. This process occurs in a similar fashion for the five conditions described.

Typical values of reference potential normalized to a scale of 0-1.0 are as follows:
On-hook leak test: 0.2
Open circuit ringer test (based on peak alternating current): 0.3
Dial pulse supervision and ring trip (based on peak alternating and direct current): 0.7
Power cross/ring ground short: 1.0

Detection circuit 10 is operated in the ring trip mode when processing unit 50 operates ringing relay 20 thereby connecting shunt network 52 in parallel with flux generator 13 by means of make contact 21. Network 52 shunts ringing current away from coil 13 when a ringing signal generator is connected to the loop by make contact 22. Thus flux generator 13 produces a magnetic flux in response to loop continuity caused by operation of the subscribers hookswitch rather than detection of ringing current.

Ringing relay contact 26 is used to prevent ringing current from appearing on the secondary side of transformer 80 by shorting current from winding 27. Ringing relay contact 25 is used to prevent shorting of the ringing generator to ground via capacitor 70.

The detector circuit of the present invention thus monitors a subscriber's loop to detect operation of the subscriber hookswitch and dial pulse signalling when the subscriber originates a telephone call. This circuit also detects operation of the subscriber hookswitch to trip the ringing generator when the subscriber initates an off hook during the ringing period.

This circuit can further test the loop facility for leakage conditions (i.e., line leak), the absence or presence of a ringer or equivalent AC load (i.e., open circuit test), and power cross/ring ground short.

It will be obvious to those skilled in the art that numerous modifications of the present invention can be made without departing from the spirit of the invention which shall be limited only by the scope of the claims appended hereto.

What is claimed is:

1. A telephone supervision circuit for use in a telephone switching system, including battery and ground sources, a processing unit operated to provide a plurality of control signals, and a ringing relay connected to and periodically operated by said processing unit, said ringing relay including a first pair of contacts, and said supervision circuit connected to a subscriber station by a subscriber loop circuit, said supervision circuit comprising:
   magnetic flux generating means included in said subscriber loop operated in response to current flow from said battery to said ground in said subscriber loop to generate a magnetic flux of an intensity proportional to said current flow;
   magnetic flux detection means connected in magnetic field proximity to said magnetic flux generating means operated in response to said magnetic flux to generate a proportional detection signal;
   threshold means connected to said processing unit, operated in response to each of a plurality of combinations of said control signals to provide an associated threshold signal; and
   comparison means connected to said threshold means, operated in response to each threshold signal to compare said detection signal to said threshold signal; said comparison means further operated in response to said detection signal being greater than said threshold signal to generate a comparison signal of a first characteristic; said comparison means further operated in response to said threshold signal being greater than said detection signal to generate a comparison signal of a second characteristic.

2. A supervision circuit as claimed in claim 1, wherein: said magnetic flux generating means comprise at least one coil connected in series in said subscriber loop.

3. A supervision circuit as claimed in claim 1, wherein: said magnetic flux detection means comprise a Hall effect device.

4. A supervision circuit as claimed in claim 3, wherein: said magnetic flux detection means further comprise an amplifier connected to said Hall effect device.

5. A supervision circuit as claimed in claim 1, wherein said comparison means comprise: a plurality of switches connected to said processing unit, each operated in response to an associated control signal to generate an associated bias signal; and
   summing means connected to said plurality of switches, operated in response to each of a plurality of combinations of said bias signals to provide said associated threshold signal.

6. A supervision circuit as claimed in claim 1, wherein: said comparison means further comprise an operational amplifier operated in response to each thrèshold signal to compare said detection signal to said threshold signal.

7. A supervision circuit as claimed in claim 5, wherein: said summing means include a resistive network.

8. A supervision circuit as claimed in claim 5, wherein each of said switches comprise a relay.

9. A supervision circuit as claimed in claim 5, wherein: each of said switches comprise a transistor.

* * * * *